United States Patent [19]

Kageyama et al.

[11] Patent Number: 4,944,032
[45] Date of Patent: Jul. 24, 1990

[54] MULTIPLEX SIGNAL PROCESSING APPARATUS

[75] Inventors: Sadashi Kageyama, Hirakata; Yoshio Abe, Ibaraki; Yoshio Yasumoto, Nara; Shuji Inoue, Neyagewa; Hitoshi Takai, Hirakata; Mitsujiro Matsumoto, Shijyonawate; Kouji Aono, Saijyo; Kiyoshi Uchimura, Hirakata; Iwasaki Eiji, Neyagawa, all of Japan

[73] Assignee: Matsushita Electric Industrial Co., Ltd., Osaka, Japan

[21] Appl. No.: 345,712

[22] Filed: May 1, 1989

Related U.S. Application Data

[62] Division of Ser. No. 70,804, Jul. 7, 1987, Pat. No. 4,882,614.

[30] Foreign Application Priority Data

Jul. 14, 1986 [JP] Japan .................................. 61-164915
Jul. 31, 1986 [JP] Japan .................................. 61-180338
Jul. 31, 1986 [JP] Japan .................................. 61-180333
Sep. 30, 1986 [JP] Japan .................................. 61-231666
Oct. 23, 1986 [JP] Japan .................................. 61-252225

[51] Int. Cl.$^5$ ........................ H04N 11/00; H04N 7/00; H04N 7/093; H04N 7/12
[52] U.S. Cl. ........................................ 358/12; 358/141
[58] Field of Search ...................... 358/12, 141

[56] References Cited

U.S. PATENT DOCUMENTS 4,551,754 11/1985 Meise et al. ..................... 358/180
4,631,574 12/1986 LoCicero et al. ................. 358/12

FOREIGN PATENT DOCUMENTS

3341393 6/1985 Fed. Rep. of Germany ........ 358/12
120386 7/1983 Japan ............................... 358/14
60-213185 10/1985 Japan .
76985 4/1987 Japan .

Primary Examiner—John W. Shepperd
Attorney, Agent, or Firm—Wenderoth, Lind & Ponack

[57] ABSTRACT

A multiplex signal processing apparatus in a singal transmitting and receiving system includes at the transmitting side: a first amplitude-modulator for modulating a first carrier by a main signal to obtain a vestigial sideband, amplitude-modulated main signal; a second amplitude-modulator for modulating a second carrier which has the same frequency but differs in phase by 90° from the first carrier by a multiplex signal to obtain a double sideband, amplitude-modulated multiplex signal; an inverse Nyquist filter for filtering this signal to obtain a vestigial sideband, amplitude-modulated multiplex signal; and an adder for adding the vestigial sideband, amplitude-modulated main and multiplex signals to obtain a multiplexed signal. The apparatus at the receiving side includes: a Nyquist filter for filtering the multiplexed signal; a carrier regenerator for regenerating the first and second carriers from the multiplexed signal; a main signal detector for detecting the main signal from the multiplexed signal passed through the Nyquist filter by using the first carrier; a filter for removing quadrature distortion from the multiplexed signal; and a multiplex signal detector for detecting the multiplex signal from the multiplexed signal passed through the filter by using the second carrier. By inverse Nyquist filtering the auxiliary signal in quadrature to the picture carrier, a normal synchronous receiver will produce a conventional television signal without distortion (crosstalk) caused by quadrature distortion of an auxiliary signal containing additional picture information while at the same time allowing relatively simple demodulation of the auxiliary signal in improved receivers without adding distortion.

5 Claims, 11 Drawing Sheets

MULTIPLEX SIGNAL PROCESSING APPARATUS

This application is a divisional of allowed application Ser. No. 070,804, filed July 7, 1987, now U.S. Pat. 4,882,614.

BACKGROUND OF THE INVENTION

1. Field of the Invention

This invention relates to an apparatus for multiplexing a specific signal with an amplitude-modulated signal, transmitting and receiving the multiplexed signal, and extracting the specific signal from the multiplexed signal.

2. Description of the Prior Art

In Japan, more than 25 years have passed since the color television broadcasting of the current NTSC (National Television System Committee) system began in 1960. In this period, to answer the requests for a finer definition and higher performance television receiver, various new television systems have been proposed. At the same time, the contents of the programs presented to the viewers have been changed from the mere studio programs or location programs to programs providing images of higher picture quality and higher realistic feeling such as cinema-size movies.

The current broadcasting is specified with 525 scanning lines, 2:1 interlace scanning, a luminance signal horizontal bandwidth of 4.2 MHz, and an aspect ratio of 4:3 (see, for example, Broadcasting Technology Series, Color Television, ed. by Japan Broadcasting Corporation, Japan Broadcasting Corporation Pub., 1961). In this background, several television signal composition methods aiming at compatibility with the current broadcasting system and enhancement of horizontal resolution have been proposed. One of such examples is disclosed in the Japanese Laid-Open Patent No. 59-171387. Considering the NTSC television signal expressed on a two-dimensional plane of temporal frequency $f_1$ and vertical frequency $f_2$, chrominance signals C are present in the second and fourth quadrants due to the phase relationship with the chrominance subcarrier fsc. The example uses the vacant first and third quadrants for multiplexing the high frequency components of the luminance signal. The chrominance signal and the multiplexed high frequency components are separated and reproduced at the receiving end, thereby enhancing the horizontal resolution.

In the current television broadcast, as is clear from the description above, the band of signals is limited by the standard, and it is not easy to add some new information in quantity. For example, methods to enhance the horizontal resolution are proposed, but many problems are left unsolved from the viewpoint of the compatibility with the current television broadcasting and the deterioration of demodulation characteristics of high frequency components in a moving picture. Besides, from the standpoint of effective use of the radio wave resources, the transmission band cannot be extended as an easy solution.

SUMMARY OF THE INVENTION

It is a primary object of this invention to present a multiplex signal processing apparatus for multiplex transmission of a large quantity of information in a defined band.

According to this invention, a multiplex signal processor at a transmitter side amplitude-modulates a main carrier by a main signal to obtain a vestigial sideband (VSB), modulated main signal; amplitude-modulates a carrier which has the same frequency as but is shifted in phase by 90° from the main carrier by a specific multiplex signal to obtain a double sideband, modulated multiplex signal; passes the double sideband, modulated multiplex signal through a Nyquist filter to obtain a vestigial sideband (VSB), modulated multiplex signal; and superposes the VSB, modulated multiplex signal on the VSB, modulated main signal to obtain a multiplexed signal, which is transmitted.

A multiplex signal processor at a receiver side has a synchronous detector and a quadrature distortion eliminating filter for demodulating the main and multiplex signals from the received multiplexed signal.

By this constitution, in, for example, television broadcasting, it is possible to obtain not only the conventional television broadcasting images but also multiplex information at the receiver, by generating a television signal capable of multiplex transmission of other information within the standard band of the existing television broadcasting. At the same time, when received the multiplexed signal by an existing television receiver, there is almost no interference by the multiplex signal, and the compatibility with the existing television receivers can be maintained. Further, since multiplex transmission of other information is possible in a band determined by the standard, it is very advantageous also from the viewpoint of effective use of radio wave resources.

DETAILED DESCRIPTION OF THE PREFERRED EMBODIMENTS

Figure 1:
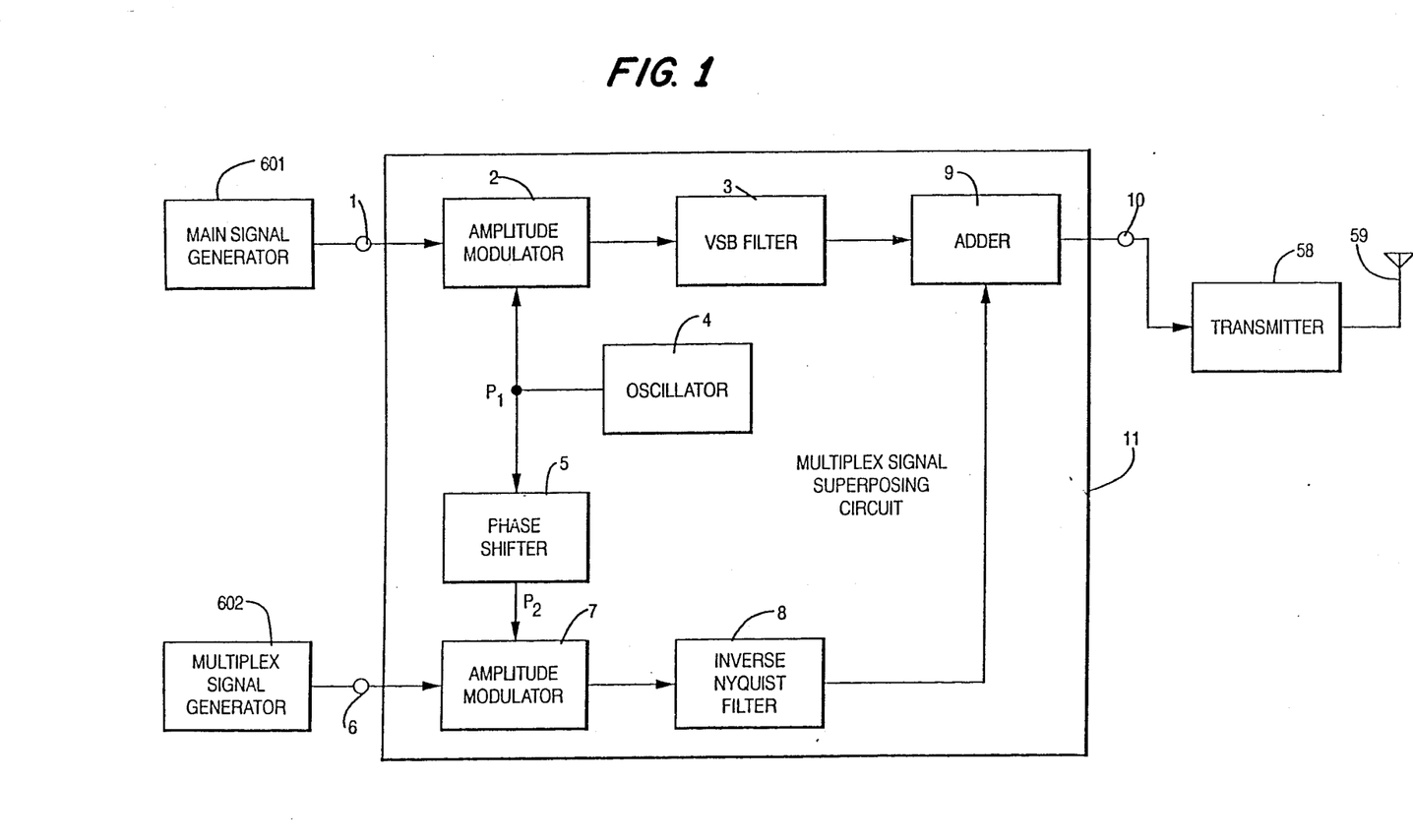
FIG. 1, FIG. 2(a), and FIG. 5 are block diagrams each showing a multiplex signal processor at the transmission side embodying this invention.

FIG. 1 is a block diagram showing a television multiplex signal processor at the transmission side as one of the embodiments of this invention, in which element 601 is a main signal generator; element 1 is a main signal input terminal; element 2 is an amplitude modulator;

element 3 is a VSB filter; element 4 is an oscillator; element 5 is a phase shifter; element 602 is a multiplex signal generator element 6 is a multiplex signal input terminal; element 7 is an amplitude modulator; element 8 is an inverse Nyquist filter; element 9 is an adder; element 10 is a composite signal output terminal; element 58 is a transmitter, and element 59 is an antenna. Numeral 11 denotes a multiplex signal superposing circuit. By a main signal generated by the original signal generator 601, for example, a video baseband signal, a carrier $P_1$ generated by the oscillator 4 is amplitude-modulated by the amplitude modulator 2. The modulated signal is band limited by the VSB filter 3 to become a vestigial sideband signal, which is fed to the adder 9. The VSB filter 3 is a filter to transform a double sideband signal into a vestigial sideband signal. The carrier $P_1$ from the oscillator 4 is shifted in phase by 90° by the phase shifter 5 to form carrier $P_2$. By a multiplex signal generated in the multiplex signal generator 602, the carrier $P_2$ is amplitude-modulated to have a double sideband by the amplitude modulator 7, and preferably in the blanking period the carrier is removed. The phase shift direction of the phase shifter 5 may be either fixed or varied at intervals of the horizontal scanning period, field or frame. The modulated multiplex signal is band limited by the inverse Nyquist filter 8, and then fed to the adder 9.

The amplitude frequency characteristic of the inverse Nyquist filter 8 is, as mentioned later, to possess a property symmetrical to the amplitude frequency characteristic immediately before video detection by the receiver with respect to the video carrier. The output of adder 9 is a composite signal. That is, the modulated signal is superposed on the modulated video baseband signal by the adder 9 to produce the composite signal. The composite signal is transmitted from the transmitter 58 with the antenna 59, but the transmission path is not limited to a wireless system. In this example, the composite signal is obtained by adding the outputs of the VSB filter 3 and the inverse Nyquist filter 8, but is is also possible to feed the sum of the outputs of the amplitude modulator 2 and the inverse Nyquist filter 8 into the VSB filter 3 to obtain the composite signal.

Figure 3A:
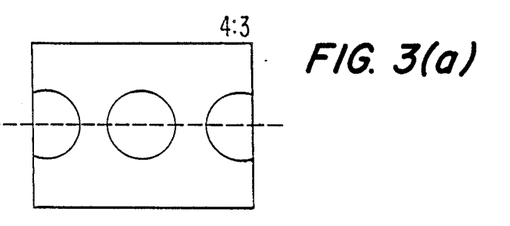
FIG. 3(a) is an example of a display screen of an existing television and FIG. 3(b) is a time-axis expression of a composite video signal.
Figure 3B:
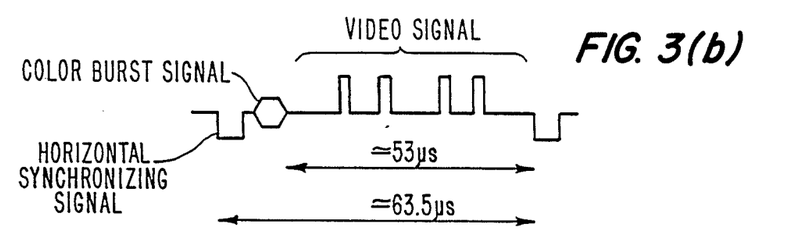
Figure 4A:
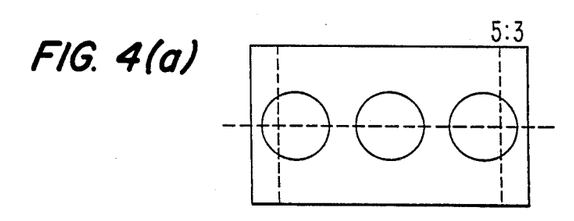
FIG. 4(a) is an example of a display screen at aspect ratio of 5:3
Figure 4B:
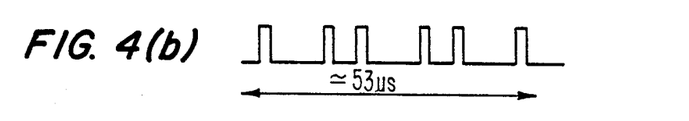
FIGS. 4(b)–(c) are time-axis expressions of a composite video signal.

Hereinafter, as one of the embodiments this invention, a television multiplex signal processor of a wide aspect ratio is explained. FIG. 3(a) shows an example of a display screen of an existing television, and FIG. 3(b) shows a composite video signal in one scanning line period near the middle of the same screen. Since aspect ratio is 4:3, of the three circles shown in the example of FIG. 3(a), a part of each of the right and circles is cut. FIG. 4(a) shows a display screen of a aspect ratio, for example, 5:3 as compared with the existing screen. FIG. 4(b) shows a video signal in one scanning line period near the middle of the same screen, and FIG. 4(c) shows a composite video signal added to a synchronous signal and a color bust signal by rewriting the video signal of FIG. 4(b) so that the time-axis scale is equal to that in FIG. 3(b).

When the aspect ratio is increased as shown in FIG. 4(a), more video information can be obtained than the screen shown in FIG. 3(a). Here, in the existing television receiver, if a video signal with an aspect ratio of 5:3 is received, in order that the picture can be received as favorably as in the conventional method, that is, in order to keep compatibility, the time-axis is expanded with respect to the television signal in the period displayed on the screen of the existing television receiver.

Figure 4C:
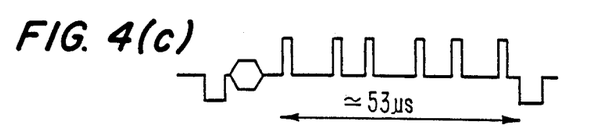

As clear from the comparison between FIG. 3(b) and FIG. 4(c), when the signal of FIG. 4(c) is received by the existing television receiver, it becomes an ellipsis stretched vertically althrough the original picture is circle, and it is necessary to expand the time-axis of the signal of FIG. 4(c). That is, when the original picture is picked up at an aspect ratio m:3 (where m is a real number not smaller than 4) stretched laterally in comparison to the conventional case, it is enough to expand the time-axis so a to be m/4 times longer than the picked-up signal corresponding portion displayed on the screen of the existing television receiver. Furthermore, in order to obtain a screen information with an aspect ratio of m:3, the remaining signal portion i sent by quadrature modulation techniques. Meanwhile, if a horizontal blanking period is not required in the pickup tube, for example, in the case of a CCD camera, it is not always necessary to expand the time-axis.

Figure 2A:
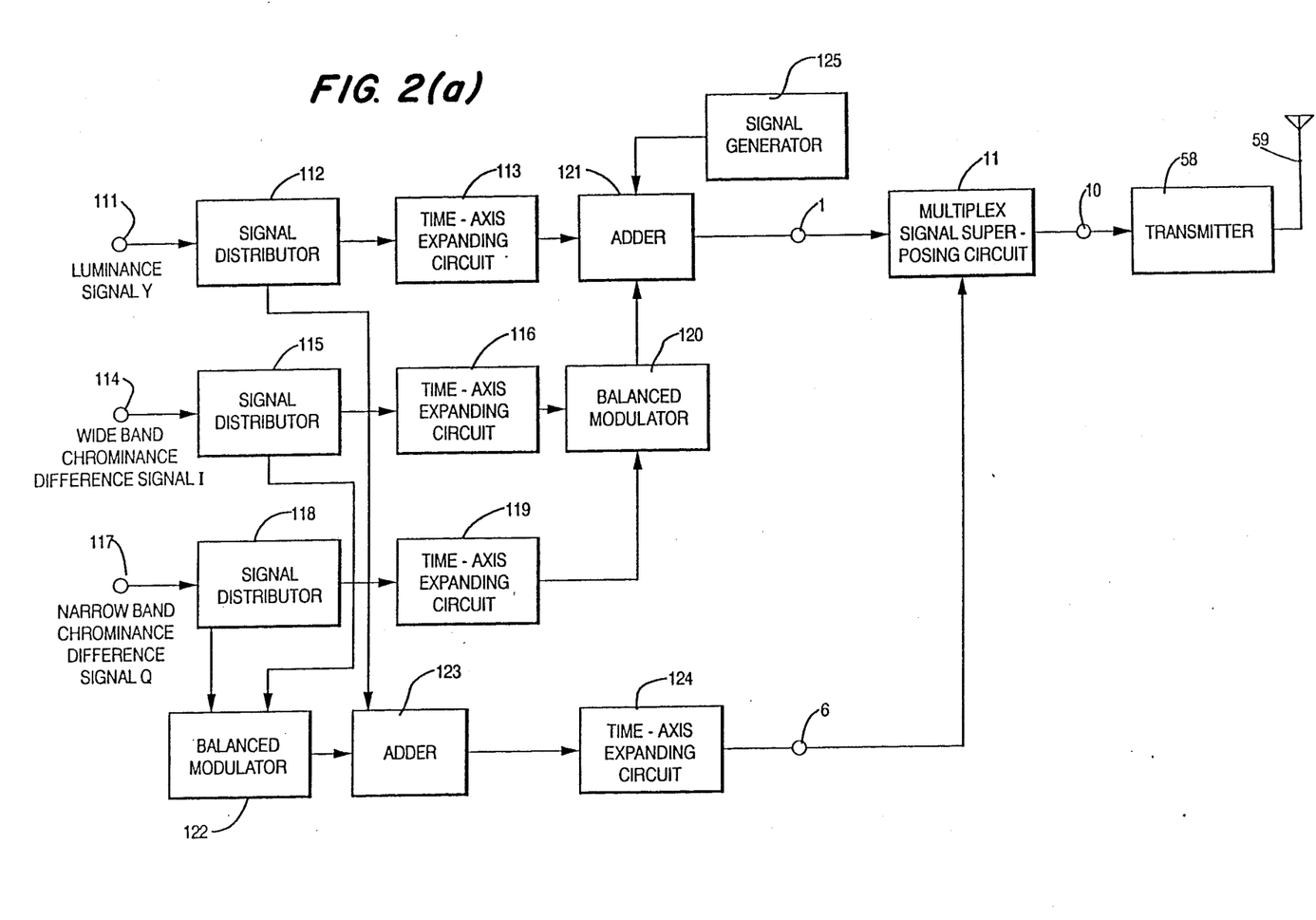

FIG. 2(a) is a block diagram showing a television multiplex signal processor with a wide aspect ratio at the transmission side in one of the embodiments of this invention. In FIG. 2(a), element 111 is an input terminal of the luminance signal Y obtained from a signal picked up by a camera having a wider aspect ratio than the existing ratio; element 114 is an input terminal of the wide chrominance difference signal I obtained from the same picked-up signal; element 117 is an input terminal of the narrow band chrominance difference signal Q obtained from the same picked-up signal; elements 112, 115 and 118 are signal distributors; elements 113, 116, 119 and 124 are time-axis expanding circuits; elements 121 and 123 are adders; elements 120 and 122 are balanced modulators; element 125 is a signal generator; element 1 is a main signal input terminal; element 6 is a multiplex signal input terminal; element 11 is a multiplex signal superposing circuit, and element 10 is a composite signal output terminal. The luminance signal Y enters the signal distributor 112, and is distributed into the time-axis expanding circuit 113 and the adder 123. Similarly, the wide band chrominance difference signal I and the narrow band chrominance difference signal Q enter the respective signal distributors 115, 118, and are distributed into the time-axis expanding circuits 116, 119, and the balanced modulator 122. The time-axis can be expanded for example, by varying the writing and reading clocks of a memory. Conventionally, when the original picture is picked up at an aspect ratio of m:3 (where m is a real number not smaller than 4) stretched laterally, the picked-up signal corresponding to the portion displayed on the screen of the existing television receiver is expanded in the time-axis by m/4 times by the time-axis expanding circuits 113 116, 119. Next, of the chrominance difference signals distributed by the signal distributors 115, 118, the remaining chrominance difference signal components other than the chrominance difference signals expanded by the time-axis expanding circuits 116, 119 are modulated by the balanced modulator 122, and are combined with the remaining luminance component other than the luminance signal expanded by the time-axis expanding circuit 113 by the adder 123. The output of the adder 123 is band compressed by the time-axis expanding circuit 124, and is fed into the multiplex signal superposing circuit 11 through the multiplex signal input terminal 6 as a multiplex signal. The output signals of the time-axis expanding circuits 116, 119 are modulated by the balanced modulator 120, and the output of the balanced modulator 120 is added by the adder 121 to the output signal from the time-axis expanding circuit 113 and a synchronous signal, a burst signal and a discriminating signal to distinguish the composite television signal of this processor from the conventional television signal, which are produced by the signal generator 125. The discriminating signal may be, for example, superposed in the vertical blanking period. The output of the adder 121 is fed into the multiplex signal superposing circuit 11 through the main signal input terminal 1 as a main signal. The output of the multiplex signal superposing circuit 11 is the composite signal in which the multiplex signal is superposed on the video base band main signal. The composite signal is transmitted through the transmitter 58 and the antenna 59.

Figure 2B:
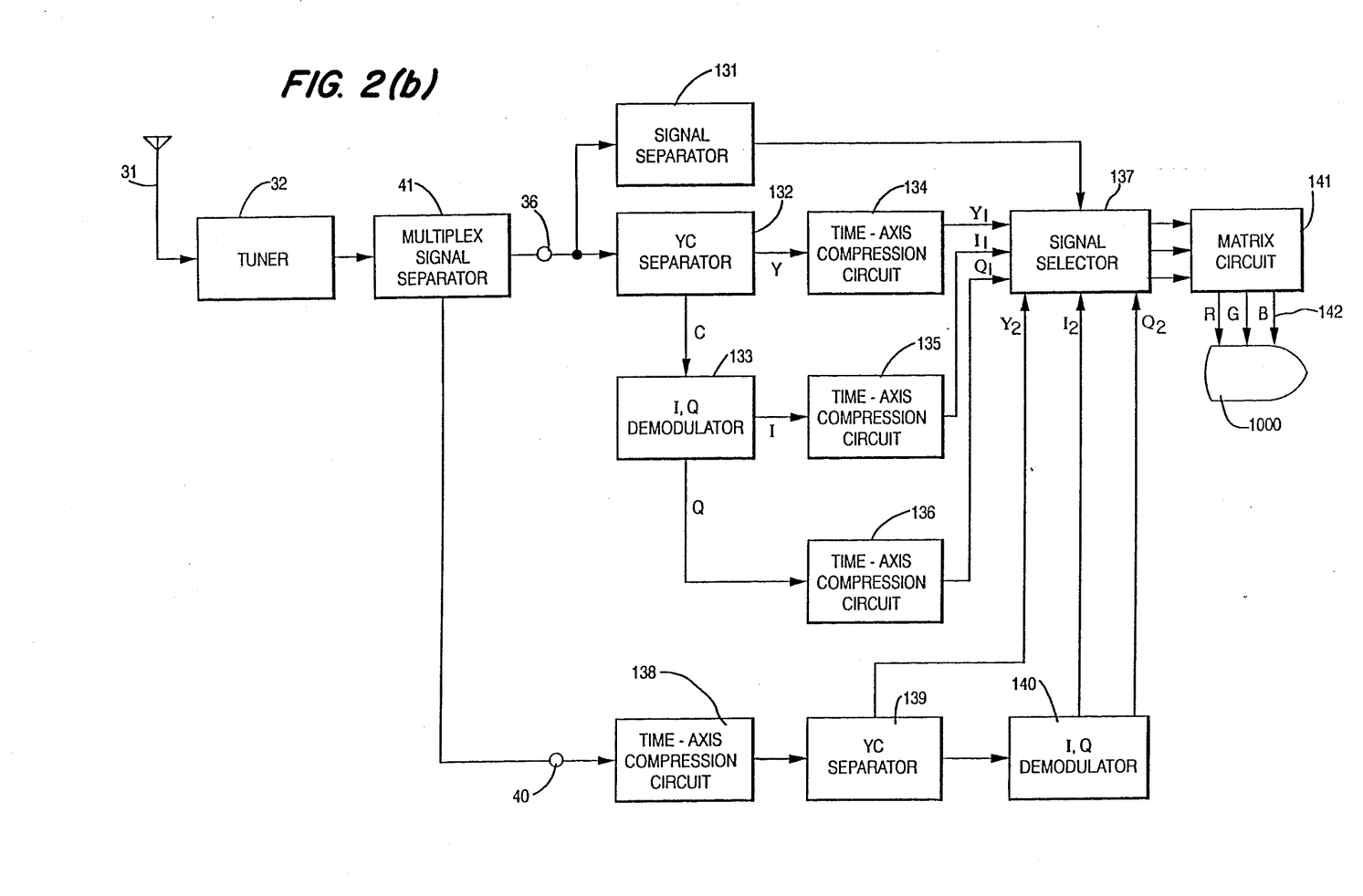
FIG. 2(b) is a block diagram showing a multiplex signal processor at the reception side embodying this invention.

FIG. 2(b) is a block diagram showing a television multiplex signal processor with a wide aspect ratio at the reception side in one of the embodiments of this invention. In FIG. 2(b), element 41 is a multiplex signal separator; element 36 is a main signal output terminal; element 40 is a multiplex signal output terminal; elements 132 and 139 are YC separators; elements 134, 135, 136 and 138 are time-axis compression circuits; elements 133 and 140 are I, Q demodulators; element 137 is a signal selector; element 131 is a signal separator; element 141 is a matrix circuit, and elements 142 are R, G, B signal output terminals. The composite signal transmitted from the transmission side and received via the antenna 31 and the tuner 32 is separated into the main signal and the multiplex signal in the multiplex signal separator 41, which are respectively delivered from the main signal output terminal 36 and the multiplex signal output terminal 40. The video baseband signal which is the main signal is separated into the luminance signal Y and the chrominance signal C by means of the YC separator 132. The signal Y is compressed in the time-axis by the time-axis compression circuit 134 to become a signal $Y_1$. The signal C is separated into chrominance difference signals I, Q by means of the I, Q demodulator 133. The signal I is compressed in the time-axis by the time-axis compression circuit 135 to become a signal $I_1$. The signal Q is compressed in the time-axis by the time-axis compression circuit 136 to become a signal $Q_1$. The multiplex signal is compressed in the time-axis by the time-axis compression circuit 138, and then is separated into $Y_2$, $I_2$ and $Q_2$ by means of the YC separator 139, and the I, Q demodulator 140. The signals $Y_1$, $I_1$, $Q_1$, $Y_q$, $I_2$ and $Q_2$ are fed into the signal selector 137, in which the signals $Y_1$, $I_1$ and $Q_1$ are selected for the portion corresponding to the screen of the conventional television receiver with an aspect ratio of 4:3, and since they are compressed in the time-axis, as for the remaining period of one horizontal scanning period, the blanking signal or the like is generated and selected inside the signal selector 137 for the conventional broadcasting signal, while the signals $Y_2$, $I_2$ and $Q_2$ are selected when receiving said wide television signal. The output signals of the signal selector 137 are converted into R, G, B signals by the matrix circuit 141. The R, G, B signals are fed into the CRT 1000.

Incidentally, the time-axis compression circuits 134, 135, 136, 138 are intended to receive the conventional television signal without any trouble, and to reproduce the television signal by compressing the time-axis expanded portion of the wide television signal having an aspect ratio stretched laterally. That is, as clear from the comparison between FIG. 3(b) and FIG. 4(c), it is necessary to compress the time-axis of the conventional television signal in order to receive the picture of the existing broadcasting without changing the aspect ratio. The compression ratio is determined by the aspect ratio.

The signal separator 131 separates, from the video baseband signal, the discriminating signal for distinguishing the television signal of the existing broadcasting from the synchronous signal, color burst signal, and the wide television signal. The signal selector 137 is controlled according to this discriminating signal.

Figure 5:
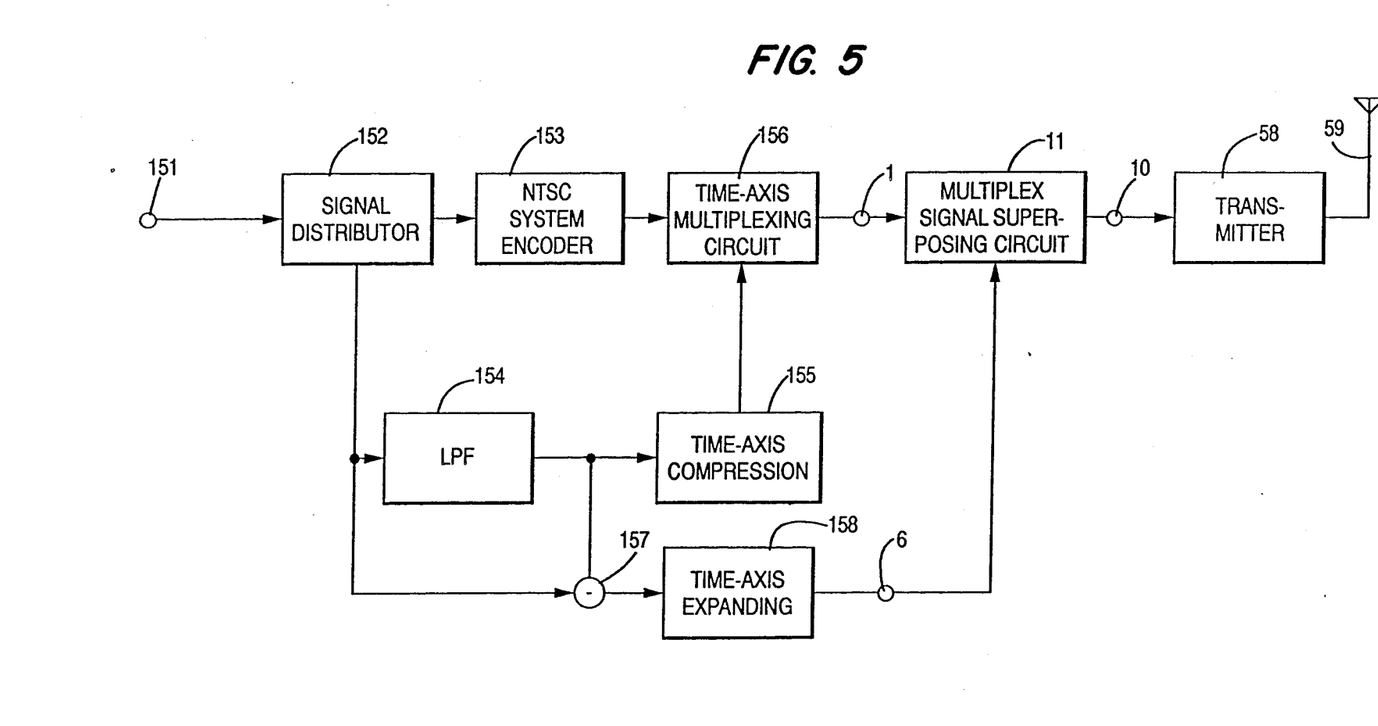

FIG. 5 is a block diagram showing a television multiplex signal processor with a wide aspect ratio in one of the embodiments of this invention, in which element 151 is an input terminal of a picture signal having an aspect ratio greater than 4:3; element 152 is a signal distributor; element 153 is an NTSC system encoder; element 154 is a low-pass filter (LPF); element 155 is a time-axis compression circuit; element 156 is a time-axis multiplexing circuit; element 157 is a subcontractor; element 158 is a time-axis expansion circuit; element 1 is a main signal input terminal; element 6 is a multiplex signal input terminal; element 11 is a multiplex signal superposing circuit, and element 10 is a composite signal output terminal.

Figure 6:
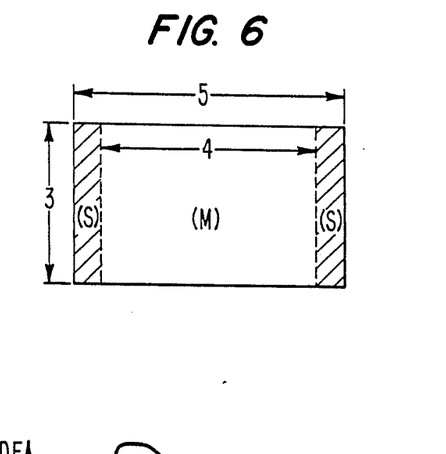
FIG. 6 is a picture composition at a different aspect ratio.
Figure 7:
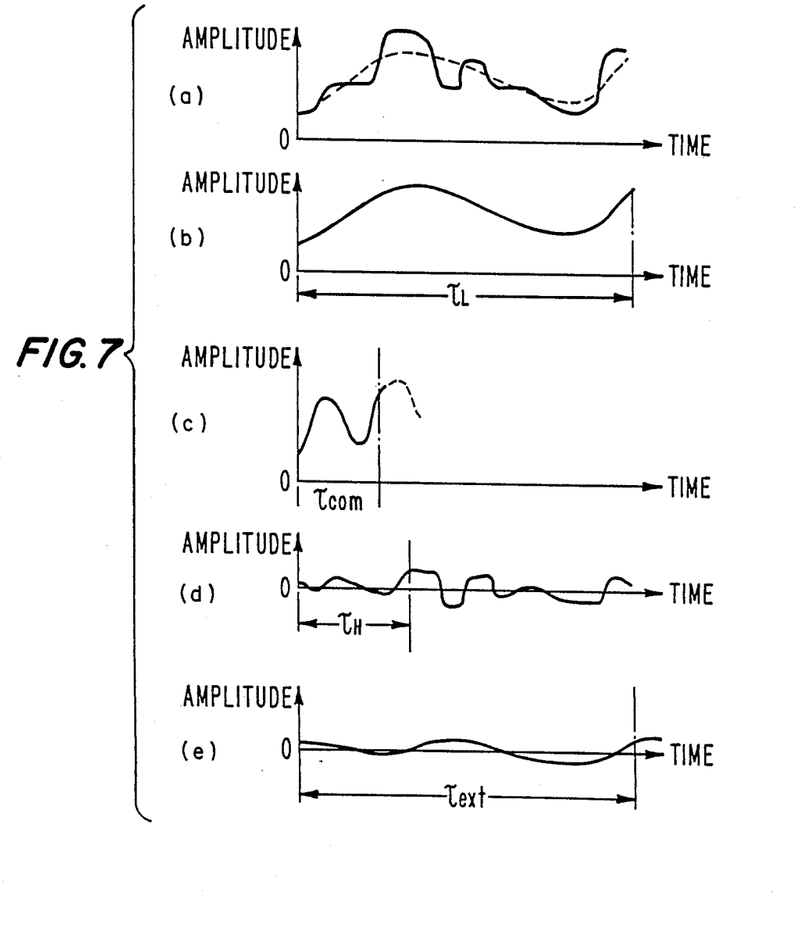
FIGS. 7(a)–(e) are signal waveform diagrams showing the signal processing step in FIG. 5.
Figure 8:
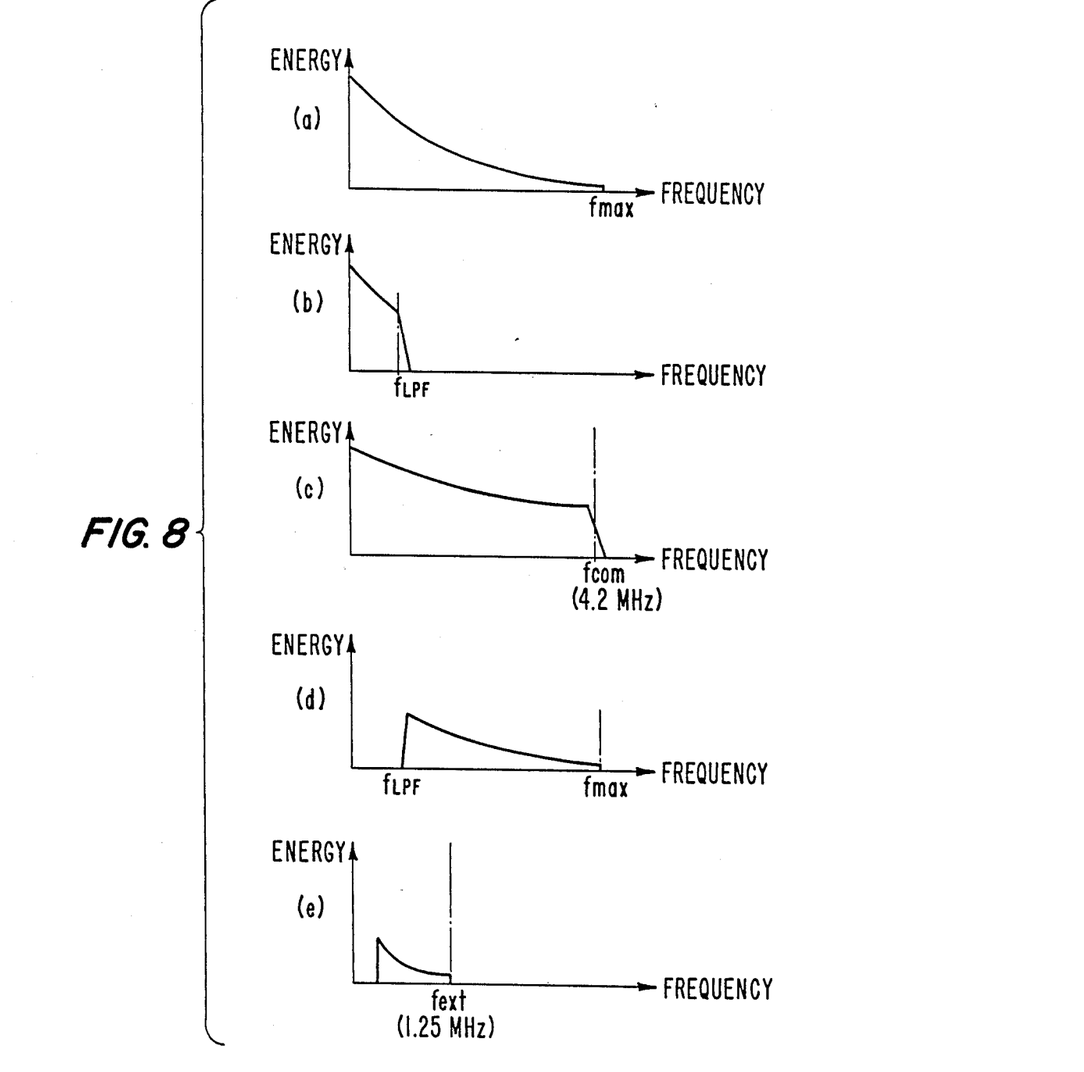
FIGS. 8(a)–(e) are spectral diagrams showing the signal processing step in FIG. 5.

Referring to FIG. 5, FIG. 6, FIGS. 7(a)-(e), FIGS. 8(a)-(e) the television multiplex signal processor in the constitution shown in FIG. 5 is described below. FIG. 6 shows a picture whose aspect ratio is 5:3. The picture signal fed into the input terminal 151 is separated, by the signal distributor 152, into a main picture signal for providing an image in the region of an aspect ratio of 4:3 shown by (M) in FIG. 6, and a sub picture signal for providing an image in the region indicated by the shaded area (S). The main picture signal separated by the signal distributor 152 is encoded by the NTSC system encoder 153 into an NTSC system signal, which is supplied into the time-axis multiplex circuit 156. The sub picture signal separated by the signal distributor 152 is supplied into the LPF 154 and the subtractor 157. This sub picture signal has a waveform as shown in FIG. 7(a), for example, on the time-axis, and on the frequency axis, as a characteristic of general picture signal, it shows a spectrum distribution low in the high frequency energy as shown in FIG. 8(a). By the LPF 154 and the subtractor 157, the sub picture signal is separated into a low frequency component of high energy (the waveform in FIG. 7(b), the frequency spectrum in FIG. 8(b), and a high frequency component of relatively low energy (the waveform in FIG. 7(d), the frequency spectrum in FIG. 8(d), which are respectively supplied into the time-axis compression circuit 155 and the time-axis expansion circuit 158. In the time-axis compression circuit 155, the low frequency component shown in FIG. 7(b), FIG. 8(b) is compressed in the time-axis as shown in FIG. 7(c), FIG. 8(c) into a frequency spectrum below the band that can be transmitted by the NTSC system, and it is supplied into the time-axis multiplex circuit 156. In the time-axis multiplex circuit 156, the low frequency component of the sub picture signal compressed in the time-axis is multiplexed on the time-axis in the horizontal blanking period and vertical blanking period of the NTSC system signal composed of the main picture signal. This time-axis multiplexed signal is supplied through the main signal input terminal 1 into the multiplex signal superposing circuit 11. In the time-axis expansion circuit 158, the high frequency component shown in FIG. 7(d), FIG. 8(d) is expanded in the time-axis so that the band is below 1.25 MHz as shown in FIG. 7(e), FIG. 8(e) and is supplied through the multiplex signal input terminal 6 into the multiplex signal superposing circuit 11. From the multiplex signal superposing circuit 11, a composite signal is obtained as described before, and it is delivered from the composite signal output terminal 10 to be transmitted via the transmitter 58 and the antenna 59.

Thus, according to this embodiment, the sub picture signal is separated into a low frequency component and a high frequency component, and the low frequency component is multiplexed on the time-axis while the high frequency component is multiplexed by quadrature modulation in the vestigial sideband of the NTSC system signal, whereby a television signal containing picture information with an aspect ratio larger than 4:3 can be transmitted. When this composite television signal is received by a television receiver of the conventional synchronous detection system, since the high frequency component of the sub picture signal does not have a DC component, detection of the NTSC system signal with an aspect ratio of 4:3 can be effected without interference. When the same signal is received by a television receiver of envelope detection system, since the high frequency component of the sub picture signal is relatively small in energy, the level of interference is small. In this embodiment, meanwhile, the LPF 154 in FIG. 5 is a one-dimensional one, but it is also possible to use a two-dimensional filter.

As described above, according to this invention, sufficient services of movies or programs of realistic feeling are possible because the image of an aspect ratio of, for example, 5:3 is directly reproduced in the receiver. Also, if received by the existing television receiver, the image of aspect ratio of 4:3 can be reproduced with no or small interference. Thus, the present invention is very effective industrially.

Figure 9:
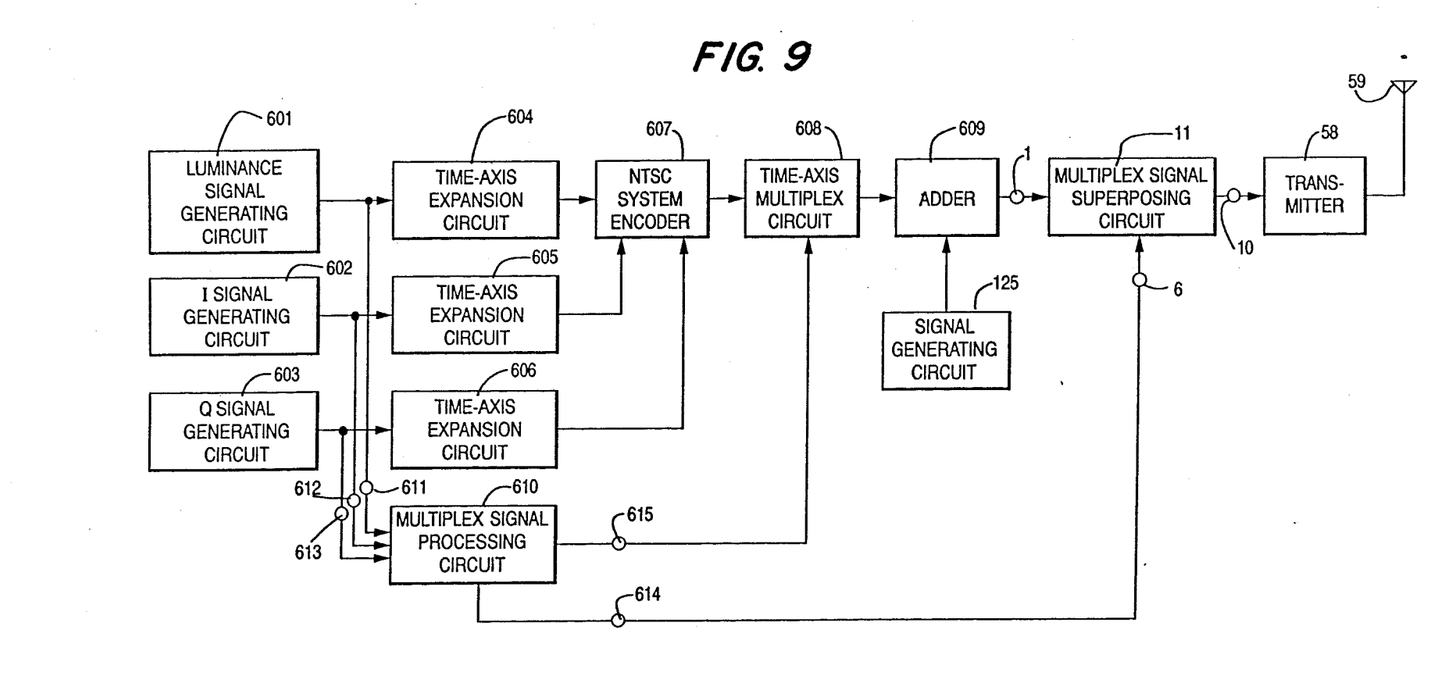
FIG. 9 is a block diagram showing a television multiplex signal processor at the transmission side according to this invention.

In addition to the television system of wide aspect ratio described hereabove, another embodiment of such system is described below. Concerning the television system of wide aspect ratio, to begin with, signal processing at the transmission side is explained herein. FIG. 9 is a block diagram of a television multiplex signal processor with a wide aspect ratio at the transmission side as one of the embodiments of this invention, in which element 601 is a luminance signal generating circuit; element 602 is an I (chrominance difference) signal generating circuit and element 603 is a Q (chrominance difference) signal generating circuit. The signal generating circuits 601, 602 and 603 generate a luminance signal, a wide band I signal and a narrow band Q signal, respectively, from a signal picked up by a television camera (not shown) having a larger aspect ratio than the conventional aspect ration of 4:3. Elements 604, 605, and 606 are time-axis expansion circuits; element 607 is an NTSC system encoder; element 608 is a time-axis multiplexing circuit; element 609 is an added; element 610 is a multiplex signal processing circuit; element 611 is a luminance signal input terminal; element 612 is an I signal input terminal; element 613 is a Q signal input terminal; element 614 is a multiplex signal output terminal; element 615 is a time-axis multiplex signal output terminal; element 125 is a signal generating circuit; element 11 is a multiplex signal superposing circuit; element 58 is a transmitter; element 59 is an antenna; element 1 is a main signal input terminal; element 6 is a multiplex signal input terminal, and element 10 is a composite signal output terminal. Incidentally, an antenna has been illustrated, but the transmission path is not limited to a wireless system, but may be a wired system. Meanwhile, the signal generating circuit 125, multiplex signal superposing circuit 11, transmitter 58, and antenna 59 have been described in connection with FIG. 1 and FIGS. 2(a)-2(b), and explanations thereof are omitted from the following description.

The luminance signal generated by the luminance signal generating circuit 601 is fed into the time-axis expansions circuit 604 and through the terminal 611 into the multiplex signal processing circuit 610. Similarly, the wide band I signal and narrow band Q signal which are respectively generated by the I signal generating circuit 602 and Q signal generating circuit 603 are respectively fed into the time-axis expansion circuit 605 and time-axis expansion circuit 606 and through terminals 612 and 613 into the multiplex signal processing circuit 610. When the original picture is picked at a horizontally stretched aspect ratio m:3 (where m is a real number not smaller than 4), the signal corresponding to the portion displayed on the screen of the existing television receiver is expanded in the time-axis by m/4 times in each of the time-axis expansion circuits 604, 605, and 606. The luminance signal and chrominance difference signal components in the remaining period other than those expanded by the time-axis expansion circuit 604, 605, and 606 are converted by the multiplex signal processing circuit 610 into a time-axis multiplex signal and a quadrature modulation signal, which are fed into the time-axis multiplex circuit 608 through the terminal 615 and the multiplex signal superposing circuit 11 through the terminal 614, respectively. The time-axis expanded output signals from the time-axis expansion circuits 604, 605, and 606 are converted into an NTSC signal in a know manner by the NTSC system encoder 607. Its output is combined with the time-axis multiplex signal by the time-axis multiplex circuit 608. The time-axis multiplex circuit 608 is required to have only an adding function. Its output is combined, by the adder 609, with a synchronous signal, a burst signal, and a discriminating signal for distinguishing the wide television signal from the conventional television signal, which are supplied from the signal generating circuit 125. The discriminating signal is superposed, for example, in the vertical blanking period. The output of the adder 609 and the quadrature modulation signal are synthesized in the multiplex signal superposing circuit 11 to be composite signal, which is transmitted through the transmitter 58 and antenna 59.

Figure 10:
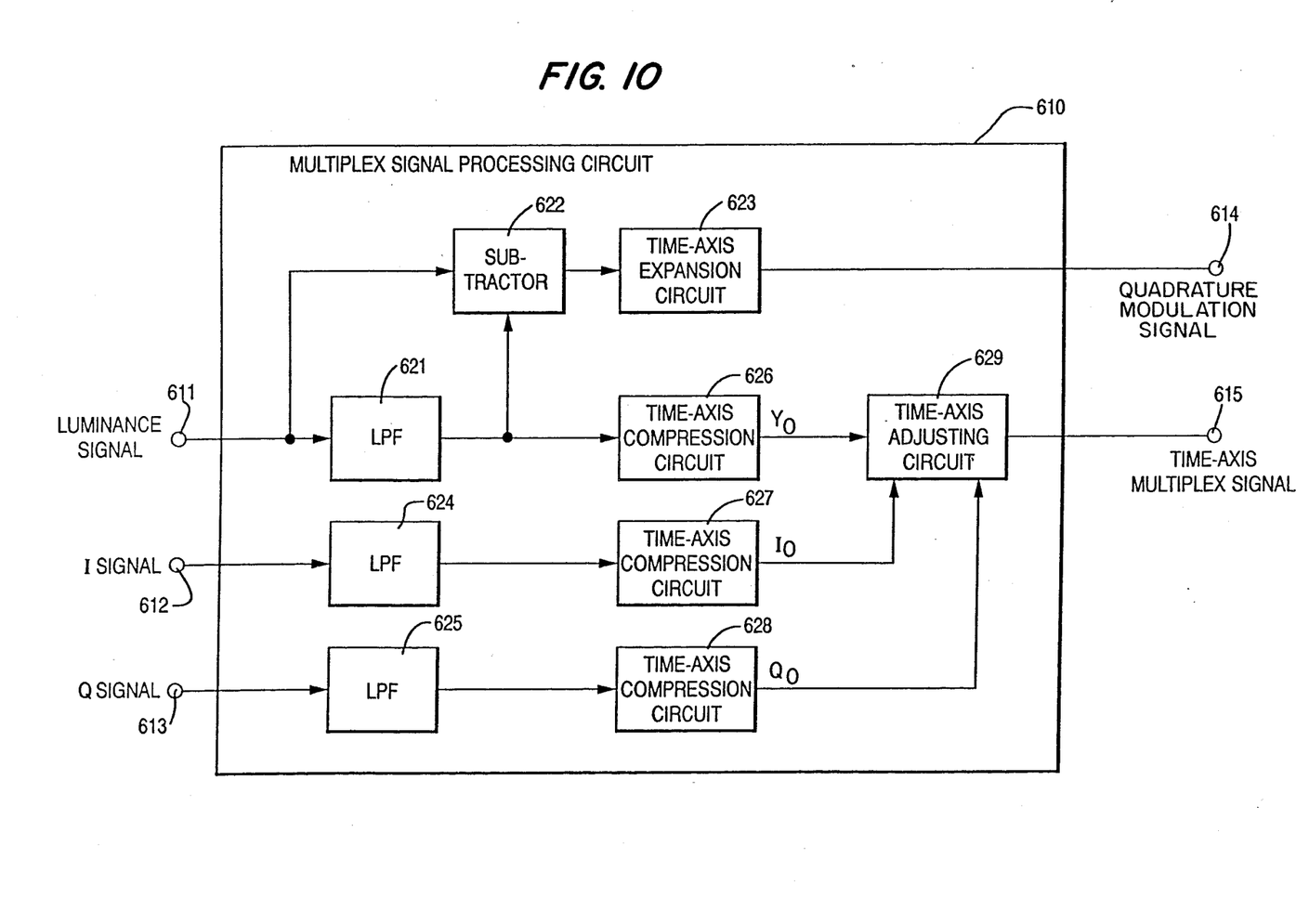
FIG. 10 is a circuit composition of an example of the multiplex signal processing circuit 610 shown in FIG. 9.

FIG. 10 is a block diagram showing an example of internal structure of the multiplex signal processing circuit 610 in FIG. 9. In FIG. 10, element 611 is a luminance signal input terminal; element 612 is a time-axis multiplex signal output terminal; elements 621, 624, and 625 are low-pass filters (LPFs); element 622 is a subtractor; elements 626, 627, and 628 are time-axis compression circuits; element 623 is a time-axis expansion circuit, and element 629 is a time-axis adjusting circuit.

Referring now to FIGS. 7(a)-(e), and FIGS. 8(a)-(e) the television multiplex signal processor having the constitution as shown in FIG. 9 and FIG. 42 is described below. The signal corresponding to the portion displayed on the screen of the existing television receiver is a main signal, and the signal corresponding to other portions, such as both sides of the wide aspect ratio screen, is a multiplex signal. The part of the luminance signal for the multiplex signal is fed through the luminance signal input terminal 611 into the LPF 621 and subtractor 622. This signal, for example, has a waveform as shown in FIG. 7(a), and on the frequency-axis it presents a spectrum profile of low energy of high frequency as shown in FIG. 8(a) as a general characteristic of such signal. By the LPF 621 and subtractor 622, the luminance signal is separated into a low frequency component with high energy (waveform in FIG. 7(b), frequency spectrum in FIG. 8(b) and a high frequency component with relatively low energy (waveform in FIG. 7(d), frequency spectrum in FIG. 8(d), which are respectively supplied into the time-axis compression circuit 626 and time-axis expansion circuit 623. In the time-axis compression circuit 626, the low frequency component shown in FIG. 7(b), FIG. 8(b) is compressed in the time-axis into a signal having the frequency spectrum settling within the band that can be transmitted by the NTSC system as shown in FIG. 7(c), FIG. 8(c). The compressed signal $Y_0$ is supplied into the time-axis adjusting circuit 629. In the time-axis adjusting circuit 629, the time-axis of the low frequency component of the luminance signal compressed in the time-axis is adjusted so that the signal can be multiplexed at least in the horizontal blanking period and vertical blanking period of the NTSC system signal composed of the main signal. For the adjustment of time-axis, for example, the signals $Y_0$, $I_0$, $Q_0$ may be each delayed by a memory or the like so that the signals are located in the vertical blanking interval sequentially in the order of, for example, $Y_0$, $I_0$ and $Q_0$ the output of the time-axis adjusting circuit 629 is the time-axis multiplex signal. In the time-axis expansion circuit 623, the high frequency component shown in FIGS. 7(d) and 8(d) is expanded in the time-axis so that the band is below the level of quadrature modulation to obtain the quadrature signal 614 as shown in FIG. 7(e) and FIG. 8(e). Next, the I signal and Q signal band are limited under the level transmittable by the NTSC system, by means of the LPFs 624 and 625, and the time-axis compression circuits 627 and 628, respectively. The outputs $I_0$, $Q_0$ of the time-axis compression circuits 627 and 628 are adjusted in time so as not to overlap with the luminance signal at least in the horizontal blanking period and vertical blanking period of the NTSC system signal composed of the main signal in the time-axis adjusting circuit 629.

Figure 11:
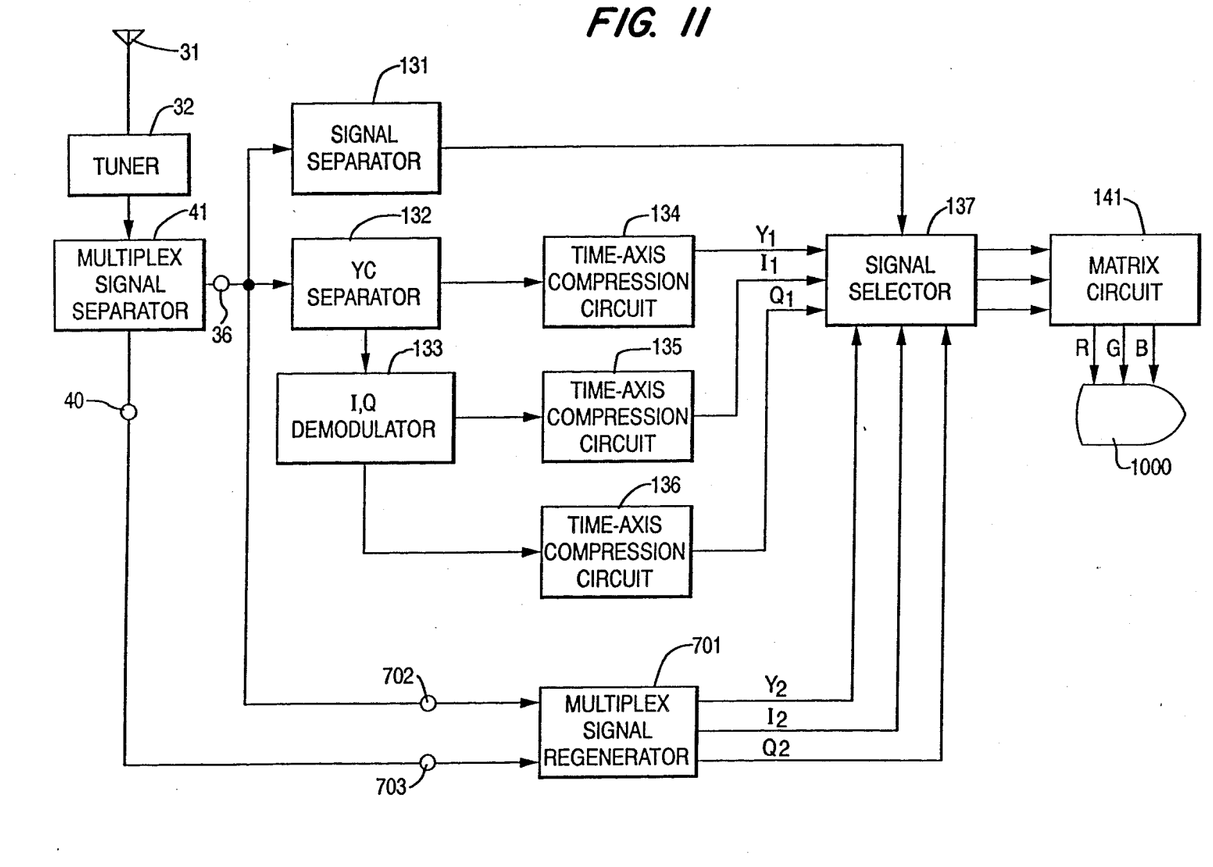
FIG. 11 is a block diagram showing a television multiplex signal processor at the reception side according to this invention.

FIG. 11 is a block diagram showing a television multiplex signal processor with a wide aspect ratio at the reception side in one of the embodiments of this invention, in which element 41 is a multiplex signal separator; 131 is a signal separator; element 132 is a YC separator; element 133 is an I, Q demodulator; elements 134, 135, and 136 are time-axis compression circuits corresponding to the time-axis expansion at the transmission side; element 137 is a signal selector; element 701 is a multiplex signal regenerator; element 141 is a matrix circuit; elements 142 are R, G, B signal output terminals; element 36 is a main signal output terminal; element 40 is a multiplex signal output terminal; element 702 is a main signal input terminal, and element 703 is a multiplex signal input terminal. The signal transmitted from the transmission side shown in FIG. 9 and received via the antenna 31 and the tuner 32 is separated into the main signal and the quadrature modulation signal by the multiplex signal separator 41, which signals are respectively delivered through the main signal output terminal 36 and multiplex signal output terminal 40. The video baseband signal which is a main signal is separated into the luminance (Y) signal and carrier chrominance (C) signal by the YC separator 132. The Y signal is compressed in the time-axis by the time-axis compression circuit 134 to become the $Y_1$ signal. The C signal is separated into the I signal and Q signal by the I, Q demodulator 133. The I signal is compressed in the time-axis by the time-axis compression circuit 1435 to become the $I_1$ signal, while the Q signal is compressed in the time-axis by the time-axis compression circuit 136 to become $Q_1$ signal. The quadrative modulator signal is transformed into the $Y_2$ signal, $I_2$ signal, and $Q_2$ signal by the multiplex signal regenerator 701. These signals $Y_1$, $I_1$, $Q_1$, $Y_2$, $I_2$, and $Q_2$ are fed into the signal selector 137, in which the $Y_1$, $I_1$, and $Q_1$ signals are selected for the portion corresponding to the screen of the existing television receiver with an aspect ration of 4:3. For the remaining period of one horizontal scanning period, a blanking signal or the like generated inside the signal selector 137 is selected when the conventional television signal is received, whereas the $Y_2$, $I_2$, and $Q_2$ signals are selected when the wide television signal is received. The output signal of the signal selector 137 is changed into R, G, B signals by the matrix circuit 141. Meanwhile, the time-axis compression circuits 134, 135 and 136 are intended to recover the wide television signal by compressing the time-axis expanded portion of the television signal having a horizontally stretched aspect ratio, as well as to allow the conventional television signal to be received without trouble. This compression ratio is determined by the aspect ratio. However, if the display unit 1000 is a liquid crystal display or the like and the blanking period is not required as in the CRT, it is not always required to compress the time-axis. Incidentally, the multiplex signal separator 41, signal separator 131, YC separator 132, I, Q demodulator 133, time-axis compression circuits 134, 135, 136, signal selector 137, and matrix circuit 141 have been described in connection with FIG. 2(b), and are omitted from the present explanations.

Figure 12:
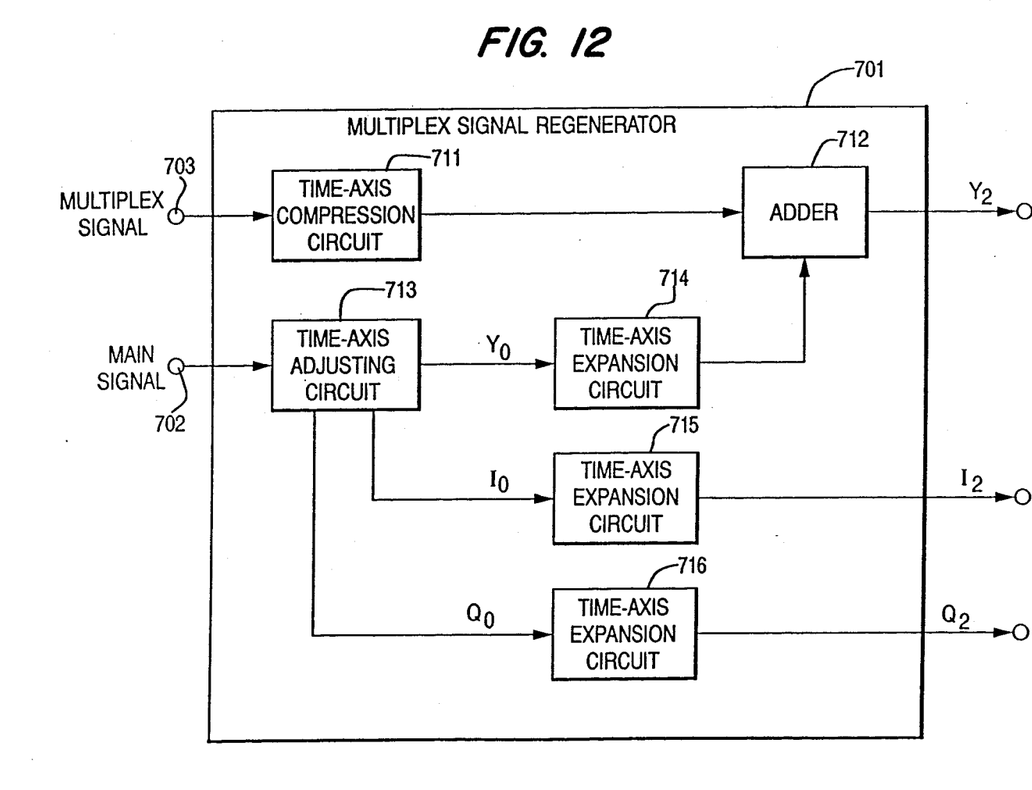
FIG. 12 is a circuit composition of an example of the multiplex signal regenerating circuit 701 shown in FIG. 11.

FIG. 12 is a block diagram showing an example of internal structure of the multiplex signal regenerator 701 in FIG. 11. This is a signal processing circuit at the reception side corresponding to the example of the multiplex signal processing circuit 601 in FIG. 10 at the transmission side. In FIG. 12, element 703 is a multiplex signal input terminal; element 702 is a main signal input terminal; element 711 is a time-area compression circuit; element 712 is an adder; element 713 is a time-axis adjusting circuit, and elements 714, 715, and 716 are time-axis expansion circuits. The multiplex signal expanded by the time-axis by the time-axis expansion circuit 623 in FIG. 10 is compressed in the time-axis by the time-axis compression circuit 711. The signal superposed in the blanking period of the main signal fed through the mains signal input terminal 702 is returned to the initial time relationship by the time-axis adjusting circuit 713 and correspond to the signals $Y_0$, $I_0$, and $Q_0$ compressed in the time-axis by the time-axis compression circuits 626, 627, and 628 in FIG. 10 are expanded in the time-axis by the time-axis expansion circuits 714, 715, and 716, respectively. Outputs of the time-axis expansion circuits 715 and 716 are the $I_2$ and $Q_2$ signals. The output of the time-axis expansion circuit 714 is combined with the output of the time-axis compression circuit 711 by the adder 712 to become the $Y_2$ signal. This adder 712 corresponds to the one-dimensional LPF 621 at the transmission side considered in FIG. 10, and if the filter is two-dimensional, two-dimensional processing corresponding to its inverse calculation is necessary.

In this way, by separating the multiplex signal into a low frequency component and high frequency component, and multiplexing the low frequency.component on the time-axis in the blanking period and multiplexing the high frequency component of small power on the frequency-axis i.e. quadrature modulation, the multiplex signal hardly interferes with the existing television receiver, and television signals that contain video information with an aspect ratio of greater than 4:3 can be transmitted and regenerated.

What is claimed is:

1. An apparatus for transmitting a wide aspect ratio television signal corresponding to an image displayed on a television screen having a wider aspect ratio than 4:3, comprising:
   a first time-axis expanding means for expanding on time-axis a first part of said wide aspect ratio television signal corresponding to the aspect ratio of 4:3 to obtain a first television signal;
   a second time-axis expanding means for expanding on time-axis a second part which is the remaining part other than the first part of said wide aspect ratio television signal to obtain a second television signal;
   a quadrature modulation means for quadrature modulating said first and second television signal to obtain a multiplexed television signal; and
   a mean for transmitting said multiplexed television signal.

2. An apparatus for receiving the multiplexed television signal transmitted from an apparatus as claimed in claim 1, comprising:
   a means for receiving said multiplexed television signal;
   a signal separating means for separating the received multiplexed television signal into said first television signal and said second television signal;
   a first time-axis compressing means for compressing on time-axis said first television signal to obtain said first part of said wide aspect ratio television signal;
   a second time-axis compressing means for compressing on time-axis said second television signal to obtain said second part of said wide aspect ratio television signal; and
   a means for composing said wide aspect ratio television signal from the first and second parts.

3. An apparatus for transmitting a wide aspect ratio television signal corresponding to an image displayed on a television screen having a wider aspect ratio than 4:3, comprising:
   a first time-axis expanding means for expanding on time-axis a first part of said wide aspect ratio television signal corresponding to the aspect ratio of 4:3 to obtain a first television signal;
   a signal separating means for separating the remaining part other than the first part of said wide aspect television signal into second and third parts;
   a time-axis compressing means for compressing on time-axis said second part to obtain a second television signal;
   a second time-axis expanding means for expanding on time-axis said third part to obtain a multiplex signal;
   a time-axis multiplexing means for multiplexing on time-axis said first and second television signal to obtain a main television signal;
   a quadrature modulation means for quadrature modulating said main television signal and said multiplex signal to obtain a multiplexed television signal; and
   a means for transmitting said multiplexed television signal.

4. An apparatus according to claim 3, wherein said third part contains high frequency components of a luminance signal.

5. An apparatus for receiving the multiplexed television signal transmitted from an apparatus as claimed in claim 3, comprising:
   a means for receiving said multiplexed television signal;
   a first signal separating means for separating the received multiplexed television signal into said main television signal and said multiplex signal;
   a second signal separating means for separating said main television signal into said first and second television signals;
   a first time-axis compressing means for compressing on time-axis said separated first television signal to obtain saidfirst part of said wide aspect ratio television signal;
   a time-axis expanding means for expanding on time-axis said separated second television signal to obtain said second part of said wide aspect ratio television signal;
   a second time-axis compressing means for compressing on time-axis said separated multiplex signal to obtain said third part of said wide aspect ratio television signal; and
   a means for composing said wide aspect ratio television signal from said first, second and third parts.

* * * * *